United States Patent
Wolber

[15] 3,698,789
[45] Oct. 17, 1972

[54] APPARATUS EMPLOYING A GRATING TO PROVIDE AND MOVE THE SOURCE OF A WAVE ENERGY DISTRIBUTION

[72] Inventor: William G. Wolber, Southfield, Mich.

[73] Assignee: The Bendix Corporation

[22] Filed: Oct. 20, 1971

[21] Appl. No.: 191,002

[52] U.S. Cl. .................. 350/3.5, 350/6, 350/129, 350/162 R
[51] Int. Cl. ..................... G02b 5/18, G02b 27/38
[58] Field of Search......300/3.5, 162 R, 188, 161, 127–129, 300/117, 6, 7, 285; 161/3.5

[56] References Cited

UNITED STATES PATENTS

| | | | |
|---|---|---|---|
| 1,983,626 | 12/1934 | Lytle | 350/162 R |
| 3,453,035 | 7/1969 | Walther | 350/162 R |
| 3,314,742 | 4/1967 | Morgan | 350/129 |
| 3,536,378 | 10/1970 | Bishop | 350/188 |

Primary Examiner—David Schonberg
Assistant Examiner—Ronald J. Stern
Attorney—John S. Bell et al.

[57] ABSTRACT

A hologram is synthesized by moving two apparent sources of diverging wave energy distributions to form different interference patterns and by superimposing these interference patterns on a recording surface. The source or apex of one diverging wave energy distribution is moved substantially in a plane. The source or apex of the other diverging distribution is moved substantially perpendicular to the recording surface by directing a thin beam of laser light to strike a blazed grating disposed substantially perpendicular to the recording surface. The grating expands the received laser beam to form a diverging wave energy distribution. The apex of this distribution is moved by deflecting the laser beam to strike different positions on the grating at different distances from the recording surface.

2 Claims, 3 Drawing Figures

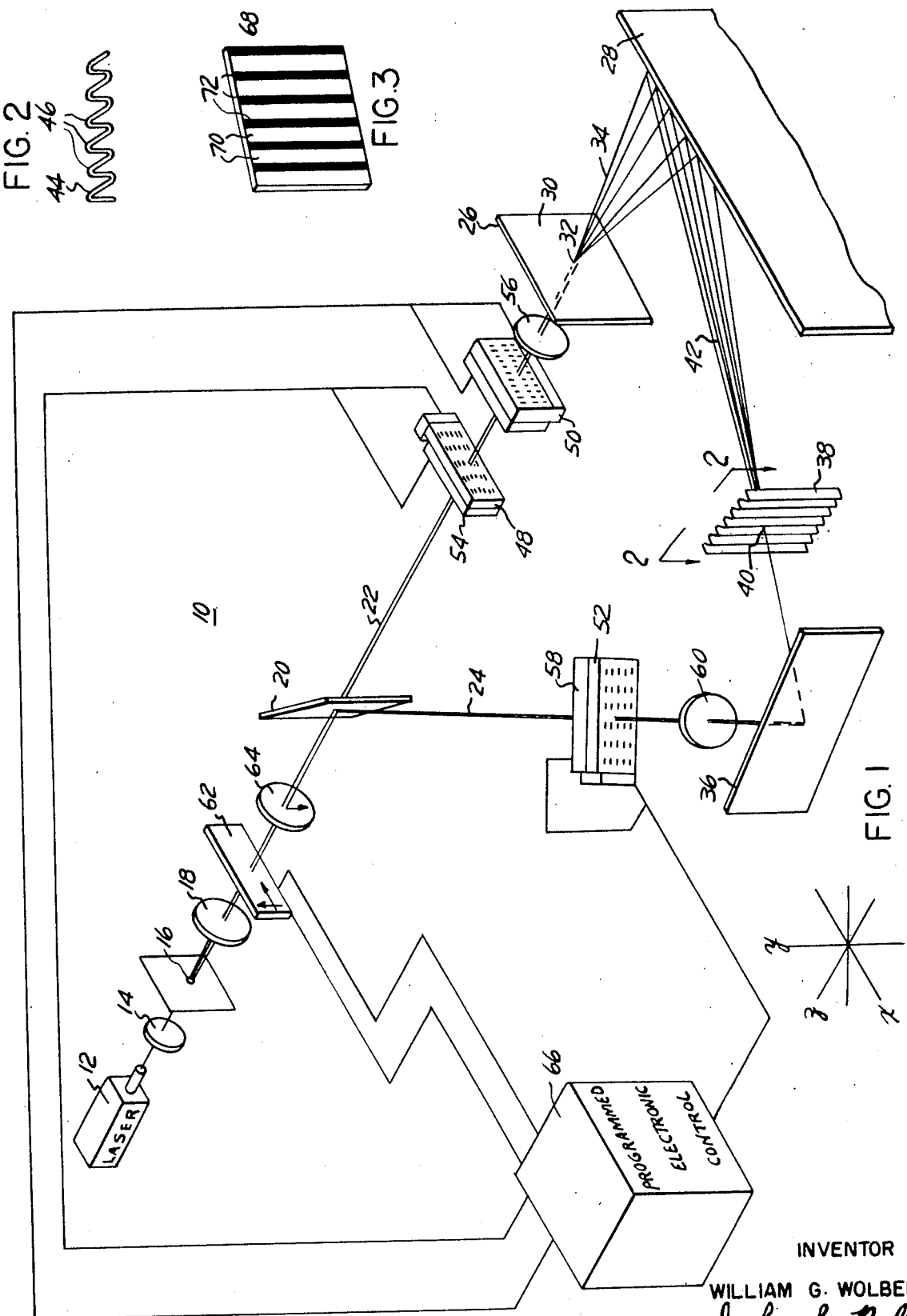

APPARATUS EMPLOYING A GRATING TO PROVIDE AND MOVE THE SOURCE OF A WAVE ENERGY DISTRIBUTION

BACKGROUND OF THE INVENTION

1. Field of the Invention

Wave energy systems in general, and holographic systems in particular.

2. Brief Description of the Prior Art

There are a number of wave energy systems in which it is necessary to move a reference spot such as an apparent source of a wave energy distribution with respect to one or more components of the system. For example, Patent application Ser. No. 116,983, "Method and Apparatus of Synthesizing a Hologram," assigned to The Bendix Corporation discloses a system for synthesizing a hologram in which the source or apex of a conical distribution of laser light is moved along a line substantially perpendicular to a recording surface. Three different structures for providing this conical distribution of laser light and moving the apex of the cone are disclosed therein.

One of the structures disclosed in application Ser. No. 116,983 for moving a reference point comprises a lens mounted in a cylinder of piezoelectric material disposed generally perpendicular to a recording surface. The lens focuses received light to a point such that light propagates from the focus point in a cone-shaped distribution. The focus point is moved generally perpendicular to the recording surface by applying electric voltages to the piezoelectric cylinder in order to cause the cylinder to expand and contract and thereby move the lens. The primary drawback of this apparatus is that the piezoelectric cylinder will only expand and contract by a small amount and thus will only move the focus point over a relatively small distance.

Another apparatus for moving the apex of a light cone comprises an L-shaped distribution of fiber-optic transmitters having their input ends disposed in a vertical column, and their output ends disposed along a direction perpendicular to a recording surface. Light propagates from the output end of a fiber-optic transmitter in a cone-shaped distribution to strike the recording medium. The apex of the conical distribution is moved toward and away from the recording surface by directing a laser beam to strike different positions on the input side of the fiber-optic transmitting assembly. The L-shape of the transmitter assembly translates changes in the direction of the laser beam to a movement of the apparent source of the cone-shaped distribution toward and away from the recording surface. The primary drawback of this apparatus is that it is expensive and relatively difficult to construct.

A third apparatus for moving the apex of an expanding light beam toward and away from a recording surface illustrated in application Ser. No. 116,983 comprises a reflector having a diffuse reflecting surface that is disposed generally perpendicular to the recording surface. Light striking a point on this reflecting surface is scattered by this surface, and a portion of the scattered light strikes the recording surface. The source or apex of the scattered light distribution is moved toward and away from the recording surface by directing a laser beam to strike different positions on the diffuse reflecting surface. One drawback of this apparatus is that light reflected from a diffuse surface does not propagate in a well-defined cone-shaped distribution. That is, light striking a diffuse reflecting surface will be scattered in all directions. A substantial amount of light will, therefore, be lost and will not reach the recording surface.

SUMMARY OF THE INVENTION

The subject invention comprises an improved apparatus for synthesizing a hologram having a blazed grating disposed at an angle to a recording medium. In the embodiment illustrated herein, the grating is disposed substantially perpendicular to the recording medium. A thin beam of coherent wave energy is directed to strike the grating. The grating expands the thin beam so that wave energy propagates from the grating in a cone-shaped distribution to strike the recording medium. The position on the grating from which wave energy propagates will be referred to herein as a reference spot. The grating expands the thin beam of wave energy to provide a wave energy distribution having a sufficiently large cross-sectional area at the recording medium so that this wave energy distribution will be capable of interfering with a second wave energy distribution and providing a readily recognizable and recordable interference pattern. A second distribution of wave energy is directed to intersect and interfere with the wave energy from the grating in order to provide a simple interference pattern. The apexes of each wave energy distribution are moved to produce different interference patterns. The apex of the wave energy distribution propagating from the grating is moved toward and away from the recording medium by deflecting the thin beam of wave energy to strike different positions on the grating. The different interference patterns produced when the apexes or reference spots of the two wave energy distributions are in different positions are superimposed on the recording medium to produce a complex interference pattern or hologram.

Two different gratings are described herein. One is a blazed grating, which is a grating having a sawtooth surface from which wave energy propagates. The sawtooth surface is formed to have a plurality of surface portions facing the recording medium so that wave energy propagates from these portions of the grating to strike the recording medium. The surface of the blazed grating, and particularly the portions facing the recording medium, are roughened to disperse or expand wave energy propagating from the grating. A second grating is described having very narrow or closely spaced alternate transparent and opaque strips or lines. The alternate strips have a width nearly as small as the wavelength of the received wave energy. For example, laser light having a wavelength of approximately one-half micron is used to form a hologram, and a grating is illustrated in which the alternate, transparent, and opaque lines have widths measured across the surface of the grating of approximately 2 microns. The narrow width, or in other words the close spacing of the alternate transparent and opaque grating portions, disperses or expands received wave energy and directs that expanding wave energy to strike the recording medium.

The apparatus of this invention utilizing a grating for providing a reference spot of wave energy and for moving that reference spot need not be limited to holographic applications. In the apparatus illustrated herein, a grating is used to provide an apparent source of wave energy. That is, a wave energy distribution is provided and directed to strike a recording medium. When viewed from the position of the recording medium, the wave energy distribution appears to originate at a point on the surface of the grating means. The apparatus of this invention can be used to provide an apparent source of wave energy and to move that apparent source along a line forming an angle with respect to wave receiving means other than apparatus for recording a synthetically produced hologram. In addition, the grating apparatus illustrated herein receives a thin beam of wave energy and expands that beam. The apex of the expanding beam is moved by directing the beam to strike different positions of the grating. The apparatus of this invention can also be used to move the apex of expanding beams of wave energy in systems other than holographic systems.

BRIEF DESCRIPTION OF THE DRAWINGS

Further objects, features and advantages of this invention, which is defined by the appended claims, will become apparent from a consideration of the following description and the accompanying drawings in which:

FIG. 1 is a schematic, perspective view of a system for synthesizing a hologram using grating and beam deflecting means for expanding a beam of wave energy and moving the apex of the expanding beam with respect to a recording surface;

FIG. 2 is a plan view of the grating illustrated in FIG. 1 as seen from the position defined by line 2—2; and FIG. 3 is a plan view illustrating the face of an alternate grating that can be used in the apparatus of FIG. 1.

DETAILED DESCRIPTION OF THE PREFERRED EMBODIMENTS

FIG. 1 illustrates a system 10 for synthetically forming a hologram. The system 10 comprises a modification of a system shown and described in detail in the above-cited Patent application Ser. No. 116,983. Much of the system 10 will, therefore, be described only very briefly. As is the case with the system described in application Ser. No. 116,983, the system 10 includes a laser source 12, objective lens 14, pinhole aperture 16, collimating lens 18, and beam splitter 20 for providing two thin beams 22 and 24 of laser light. A transparent glass sheet 26 is disposed to receive beam 22, and a recording photographic film 28 is disposed downstream from, and generally parallel to, the glass sheet 26. Glass sheet 26 has a ground or diffuse surface 30 which causes light striking that surface to scatter or expand. Beam 22 striking any point or reference spot 32 on glass sheet 26 is expanded by the diffuse surface 30 to propagate in a cone-shaped distribution 34. A mirror 36 is positioned to receive beam 24 and direct that beam toward a grating 38. Grating 38 is disposed substantially perpendicular to recording film 28. Beam 24 striking a point 40 on grating 38 is expanded by that grating to propagate in a cone-shaped distribution 42 to intersect and interfere with distribution 34 proximate recording film 28.

A side view of the grating 38 taken from the position defined by line 2—2 is shown in FIG. 2. Grating 38 is a blazed grating. That is, it has a sawtooth surface 44 from which light propagates to strike recording film 28. There are a number of known methods for forming a blazed grating. For example, a sawtooth pattern can be cut or machined into a glass surface in order to form such a grating. Or, a piece of glass machined in this manner can be used as a mold to form blazed gratings from plastic material. Blazed gratings molded in this manner will have the sawtooth shaped surface on the side receiving wave energy as well as the side from which wave energy propagates, as is the case with grating 38. Sawtooth surface 44 has a plurality of surface portions 46 which face film 28 and thus direct light toward that film. The surface portions 46 are roughened so that they disperse light and cause beam 24 to expand as it propagates from grating 38. A number of known methods can be used to roughen the surface portions. For example, grating 38 can be sandblasted. It does not matter if the remaining portions of surface 44 are also roughened in the process of roughening surface portions 46.

The synthesizing system 10 also includes two acousto-optic deflector/modulators 48 and 50 for deflecting beam 22 to move reference point 32 to various positions on glass sheet 26. A third acousto-optic deflector/modulator 52 deflects beam 24 to move reference point 40 along grating 38 toward and away from recording film 28. A Pockel cell 54 and analyzer 56 are disposed in beam 22 to control the intensity of light distribution 34, and a second Pockel cell 58 and analyzer 60 are disposed in beam 24 to control the intensity of light distribution 42. In addition, a third Pockel cell 62 and analyzer 64 are disposed upstream from beam splitter 20 in order to block the propagation of light from reference spot 32 and 40 during the time in which those reference spots are being moved from one position to another in order to prevent the bleaching of recording film 28. A programmed electronic control 66 controls the operation of the three acousto-optic deflector/modulators 48, 50, and 52, and the three Pockel cells 54, 58, and 62.

The thin beams 22 and 24 strike glass sheet 26 and grating 38, respectively, which expanded those beams to form light distributions having sufficiently large cross-sectional areas to be capable of interfering and providing a readily recordable and observable interference pattern. The deflector/modulators 48 and 50 operating under the control of programmed electronic control 66 deflect beam 22 to move reference spot 32 from one position to another on the plane defined by glass sheet 26. To a first approximation, in forming a hologram for providing an image of an object, spot 32 is moved along the projection of that object onto a plane. Deflector/modulator 52 deflects beam 24 to move reference spot 40 to strike different positions on grating 38 and thus move that reference spot along a line substantially perpendicular to the plane of glass surface 26. To a first approximation, reference spot 40 undergoes motion perpendicular to plane 26, or in other words a Z axis motion, that is exactly opposite to the perpendicular or Z axis motion that spot 32 would undergo if it were allowed to follow the surface of the object rather than being constrained to move only in a single plane. The motion of reference spots 32 and 40 is described more completely and mathematically in the above-cited application Ser. No. 116,983. The light distributions propagating from those reference spots create different interference patterns for each of the different positions of those spots. The different interference patterns are superimposed on each other by the recording film 28 to provide a hologram. The reference spots 32 and 40 represent a different position on the object whose image will be provided by the synthetically created hologram for each of the different positions in which those two reference spots are placed. Pockel cells 54 and 58 operating under the control of programmed electronic control 66 adjust the polarization of beams 22 and 24, respectively, so that together with analyzers 56 and 60 they provide light distributions 34 and 42 with intensities that correspond to the relative intensity of the points on the object represented by the particular positions of reference spots 32 and 40. Pockel cell 62 operating under the control of electronic control 66 alters the polarization of the beam received from laser source 12 so that it, together with analyzer 64, blocks propagation of any light to recording film 28 during the time when reference spots 32 and 34 are being moved from one position to another to thereby prevent film 28 from being over-exposed and thus bleached. Film 28 records and superimposes the various interference patterns produced for the different positions of reference spots 32 and 40 to create a hologram. This hologram can be used in the same manner as any conventionally formed hologram to provide an image of an object. For example, a three-dimensional image of an object can be formed by directing a reference beam of laser light to strike the hologram synthetically produced and recorded on film 28.

FIG. 3 illustrates an alternate grating 68 that can be used to replace grating 38 in the system 10. Grating 68 is not a blazed grating, but simply comprises a plurality of alternate transparent strips or lines 70 and opaque strips or lines 72. Grating 68 may be formed, for example, by cutting or etching opaque strips 72 on a transparent glass sheet. Grating 68 is not roughened to expand a received beam of laser light. Instead, alternate transparent and opaque strips 70 and 72 are spaced apart a distance some small multiple of the wavelength of the laser light forming beam 24. That is, strips 70 and 72 have a width, measured across the surface of grating 68, that is, less than 10–100 wavelengths of the laser light of beam 24. Visible laser light has a wavelength of approximately one-half micron. Gratings may be formed in which the lines 70 and 72 have a width of approximately two microns according to processes well known in the grating art. In operation, beam 24 will have a diameter of approximately 1 millimeter and will thus simultaneously strike a large number of the alternate transparent and opaque strips 70 and 72 of grating 68. The close spacing of these strips causes light transmitted through the thin strips or slits 70 to diverge so that beam 24 is expanded by grating 68 and directed toward recording film 28. Beam 24 is deflected by deflector/modulator 52 to strike different positions on grating 68 to move spot 40 and thereby produce different interference patterns which are superimposed by film 28 to form a hologram.

Having thus described several embodiments of this invention, a number of modifications will occur to those skilled in the art. Therefore, what is claimed is:

1. In a system having means for receiving wave energy, an improved apparatus for expanding a thin beam of wave energy and moving the apex of said expanding beam with respect to said receiving means comprising:

blazed optical grating having a roughened surface for expanding a received beam of wave energy, said grating being disposed transverse to said wave energy receiving means, said blazed surface defining alternate surface portions that face said receiving means to direct wave energy toward said receiving means; and beam deflecting means for directing said beam to strike various positions on said grating and thereby move the apex of said expanding beam with respect to said receiving means.

2. The system of claim 1 in which:

the system comprises a system for synthesizing a hologram;

said wave energy receiving means comprises a recording medium;

said grating is disposed substantially perpendicular to said recording medium; and said beam deflecting means moves said apex across said grating along a path substantially perpendicular to said recording medium.

* * * * *